United States Patent
Yang

(10) Patent No.: US 7,720,069 B2
(45) Date of Patent: May 18, 2010

(54) METHOD FOR PREVENTING ETHERNET FROM BEING ATTACKED

(75) Inventor: Lei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 10/577,697

(22) PCT Filed: Aug. 27, 2004

(86) PCT No.: PCT/CN2004/000997

§ 371 (c)(1),
(2), (4) Date: Mar. 15, 2007

(87) PCT Pub. No.: WO2005/043815

PCT Pub. Date: Aug. 12, 2005

(65) Prior Publication Data

US 2007/0274311 A1    Nov. 29, 2007

(30) Foreign Application Priority Data

Oct. 30, 2003   (CN)   ............ 2003 1 0103400

(51) Int. Cl.
*H04L 12/24*   (2006.01)
(52) U.S. Cl. ...................... 370/392; 726/22
(58) Field of Classification Search ............ 370/392; 726/22–24, 3; 709/230
See application file for complete search history.

(56) References Cited

U.S. PATENT DOCUMENTS

| | | | | |
|---|---|---|---|---|
| 6,115,376 A | * | 9/2000 | Sherer et al. | 370/389 |
| 7,039,049 B1 | * | 5/2006 | Akgun et al. | 370/389 |
| 7,263,559 B2 | * | 8/2007 | Yao et al. | 709/230 |
| 7,272,846 B2 | * | 9/2007 | Williams et al. | 725/111 |
| 7,386,876 B2 | * | 6/2008 | Kim | 726/3 |
| 2003/0033531 A1 | | 2/2003 | Hanner | |
| 2004/0003285 A1 | * | 1/2004 | Whelan et al. | 713/201 |
| 2005/0076227 A1 | * | 4/2005 | Kang et al. | 713/188 |

FOREIGN PATENT DOCUMENTS

CN   1411209 A   4/2003

OTHER PUBLICATIONS

International Search Report dated Dec. 30, 2004, corresponding to PCT/CN2004/000997.

* cited by examiner

*Primary Examiner*—Min Jung
(74) *Attorney, Agent, or Firm*—Finnegan, Henderson, Farabow, Garrett & Dunner LLP

(57) ABSTRACT

A method for preventing Ethernet from being attacked is provided. The method comprises the steps as follows: after detecting a new connection between a port and a terminal device and receiving a data packet from the terminal device, an Ethernet communication device establishing and storing a fixed map between the port and a hardware address of the terminal device, then forwarding the data packet according to the fixed map; after detecting a disconnection between the port and the terminal device, the Ethernet communication device deleting the fixed map.

11 Claims, 2 Drawing Sheets

METHOD FOR PREVENTING ETHERNET FROM BEING ATTACKED

CROSS REFERENCE TO RELATED APPLICATIONS

This application is a National Phase Patent Application of International Application Number PCT/CN2004/000997, filed on Aug. 27, 2004, which claims priority of Chinese Patent Application Number 200310103400.7, filed on Oct. 30, 2003.

FIELD OF THE TECHNOLOGY

The invention relates to network security, in particular to a method for preventing Ethernet from being attacked.

BACKGROUND OF THE INVENTION

At present, destruction of network virus becomes more and more diversified and many new destructive methods appear. Attack to network reliability is one kind of these new destructive methods. The purpose of this kind of attack is not to steal information, but to attack network devices targeting on security vulnerabilities in networks and destroy normal network communication. Consequently, network paralysis will be caused and more losses will be brought to users. The attack to Ethernet is a familiar mode of this kind of attack.

In conventional networks, Ethernet is mostly used in an inner network which is considered to be very safe. Therefore, network security precaution tactics are set only at the exits of the inner network, but not within it. At the same time, because of different users existing in the inner network, it is impossible for a network management department to monitor and control the network usage of each user within the inner network. Thus, with continuous development of new destructive methods caused by computer virus and increase in application of middle and low end network products which are easy to be attacked, attacks to Ethernet become easier and easier. In addition, with the rise of broadband and popularization of new-style services, Ethernet is applied in outer networks relative to the network management department more frequently, for example a broadband cell that is accessed by means of an Ethernet. In such a case, Ethernet is easier to be attacked.

For users that communicate with others through Ethernet, once Ethernet is attacked and network paralysis occurs, there will be massive losses which are in direct proportion to the paralysis time even if no valuable data is lost; for companies which operate business based on Ethernet, such loss is more serious than losing data.

In Ethernet, the address of a host is identified by a Media Access Control (MAC) address. When data is transmitted, a destination MAC address and a source MAC address need to be carried in a data packet. Ethernet communication device, such as switch, determines a forwarding port for the data packet by the MAC address information. At present, forwarding data packets in switch is based on MAC address learning mechanism. As shown in FIG. 1, taking the MAC address of PC 1 as MAC 1, and the MAC address of PC 2 as MAC 2, when receiving a data packet transmitted by PC 1, the switch records the MAC address information carried in the data packet and the information of the port which receives the data packet, namely, it establishes a map between MAC 1 and Port 1. Similarly, a map between MAC 2 and Port 2 is established. In this way, the switch can establish a map between the MAC address information of each host and its associated port information, and store this map in a MAC table. As shown in FIG. 1, there are two entries in the MAC table in which MAC 1 associates with Port 1 and MAC 2 associates with Port 2. When receiving a data packet needed to be transmitted to PC 1, the switch firstly searches the corresponding Port 1 in the MAC table according to the MAC address MAC 1 of PC 1, then transmits the data packet to PC 1 via Port 1.

There is no authentication mechanism in the above-mentioned MAC address learning process, so some malicious users may attack a single user in Ethernet or whole Ethernet. This kind of attack may be implemented through MAC address cheating or MAC address bombing.

FIG. 2 schematically illustrates an attack process through MAC address cheating. As shown in FIG. 2, if the user of PC 2 is a malicious user and plans to attack PC 1, he may transmit a data packet carried with MAC 1 in source MAC address field from PC 2. Then, the switch will implement a learning process to establish a map between MAC 1 and Port 2. That is, after this learning process, the map between MAC 1 and Port 1 in the switch's MAC table will transfer to the map between MAC 1 and Port 2 Therefore, all the data packets to be sent to PC 1 will be transmitted to Port 2 and then to PC 2, resulting in PC 1 failing to receive the data packets normally. If the malicious user adopts the same method to attack multiple hosts and even all hosts in Ethernet, the whole Ethernet will be close to paralysis.

Besides the above-mentioned MAC address cheating, malicious users can attack Ethernet through MAC address bombing. For example, malicious users can continually send data packets with varying source MAC addresses from PC 2, e.g., the MAC address in the first data packet is MAC 1, the MAC address in the second data packet becomes MAC 3 and the MAC address in the third data packet is changed to MAC 8. Thus the switch needs to update the MAC table after receiving each data packet with different source address, and the MAC table of the switch will be in an unstable state. If the source MAC address carried in these data packets is the true address of a network device in Ethernet, this network device cannot communicate normally. This method is usually used by viruses to implement MAC bombing to whole Ethernet through the hosts which are infected by viruses, thereby destroying normal operations of the whole Ethernet.

To avoid above attacks to Ethernet, it is popular for a switch to bind host MAC address with a switch port, that is, if establishing a fixed map between a port and a MAC address, the switch no longer needs to learn any dynamic MAC address. Thus the map between the MAC addresses and the ports will not be changed for receiving a new data packet, and the MAC table becomes a fixed mapping table. In this way, attacks such as MAC address cheating or MAC address bombing will be avoided effectively.

However, this kind of binding relationship needs to be configured in a switch by a network administrator according to the fixed network connection, and once the configuration is accomplished, the network will be in a fixed mode. A new computer or other legal Ethernet devices can not communicate when they are connected to the network, a computer with a changed Ethernet Network Interface Card (NIC) can not communicate because of different MAC addresses, and a computer moved from one place to another can not communicate because of the change of connection port.

SUMMARY OF THE INVENTION

The present invention provides a method for preventing Ethernet from being attacked, comprising the steps of:

establishing and storing a fixed map between a port and a hardware address of a terminal device, then forwarding a data packet according to the fixed map after an Ethernet communication device detects a new connection between the port and the terminal device and receives a data packet from the terminal device; and deleting the fixed map after the Ethernet communication device detects a disconnection between the port and the terminal device.

It can be seen from the technical solution above, when a terminal device is connected to an Ethernet communication device and transmits a data packet, the Ethernet communication device learns the hardware address of the port to establish a map between the hardware address of the terminal device and the port. After the terminal device is disconnected from the Ethernet communication device, the Ethernet communication device will delete such map, and when the terminal device is connected to the port once again or a new terminal device is connected to the port, the communication device will re-establish a map through learning between the hardware address of the terminal device or that of the new terminal device and the port. Compared with the prior art in which a fixed mapping table is established and entries in the table are modified manually by a network administrator, the present invention will automatically delete the old map and establish a new map, thus brings more convenience to network administrators, improves network maintenance efficiency and decreases maintenance cost.

In addition, compared with the circumstance in which the hardware address table is updated frequently, in the present invention, once the hardware address table is established, the map of the port in the hardware address table is relatively fixed and will not be changed after each reception of data packet, unless disconnection between the terminal device and the communication device is detected. By the invention, MAC address cheating and MAC address bombing can be avoided effectively, risk of attacks to Ethernet is decreased and security and reliability of network is improved.

DETAILED DESCRIPTION OF THE INVENTION

Now, an embodiment of the present invention will be described in detail hereinafter with reference to accompanying drawings.

In Ethernet, all data packets to be forwarded come from user devices in a user layer of a network. The user devices include Ethernet terminal devices such as PCs, servers, IP telephone sets and so on, and switch which is in access layer connect these user devices together. Each of the Ethernet terminal devices has respective MAC addresses which usually do not change, i.e., the MAC address of each port at the switch usually does not change, unless the MAC addresses corresponding to the switch ports may change only under the circumstances of the entire terminal device being replaced, the PC network NIC being changed or the terminal device being moved with a long distance, under which physical connection between the terminal device and the switch needs to be disconnected. The present embodiment applies a learning mechanism to the switch, and determines whether the MAC table needs to be updated by detecting whether the physical connection between the terminal device and the switch is cut off through detection of physical signals, thus can prevent Ethernet from being attacked by malicious users through MAC address cheating or MAC address bombing, and overcome the disadvantages of system maintenance inconvenience and high maintenance cost induced by the fixed MAC table.

Figure 1:
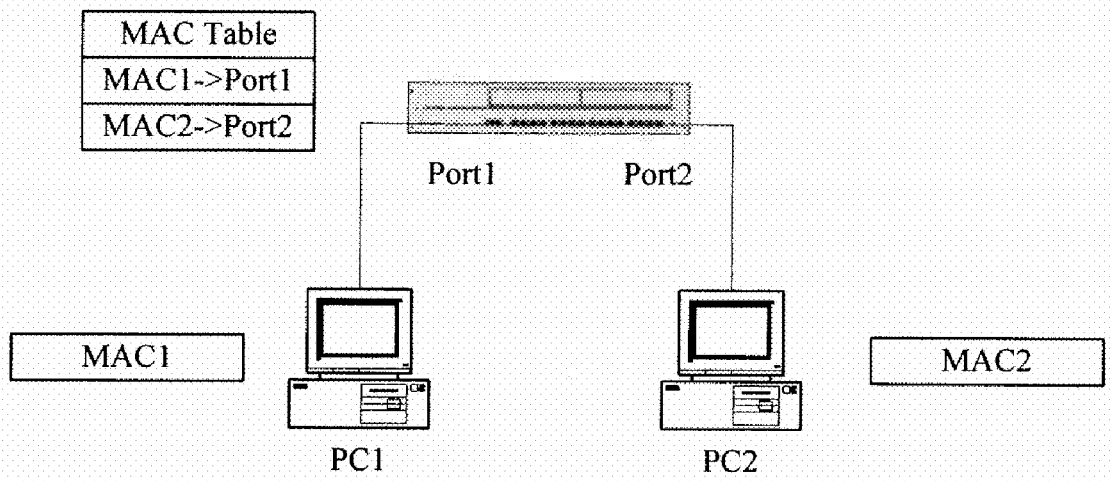
FIG. 1 is a schematic diagram illustrating a MAC learning mechanism in IP Ethernet.
Figure 2:
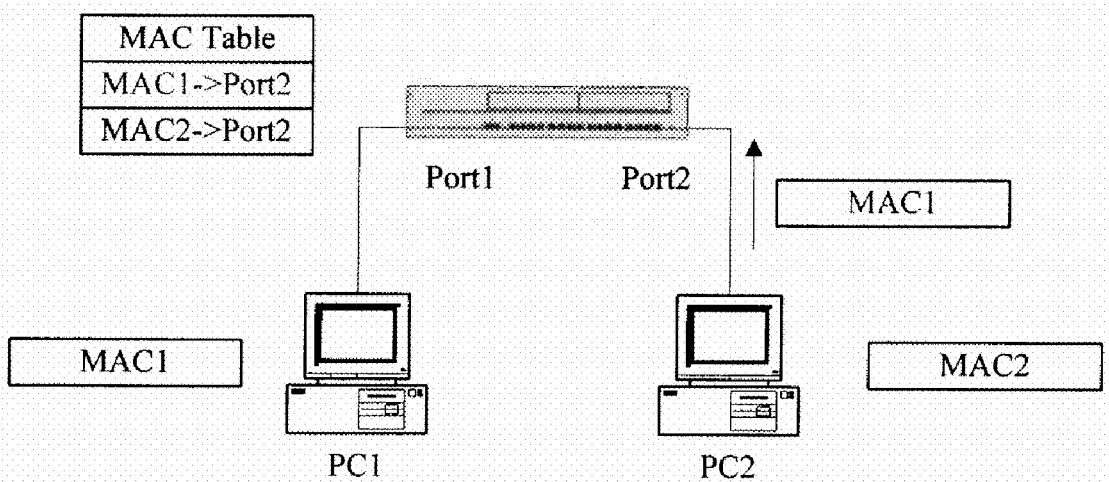
FIG. 2 is a schematic diagram illustrating an attack process of MAC address cheating in Ethernet.
Figure 3:
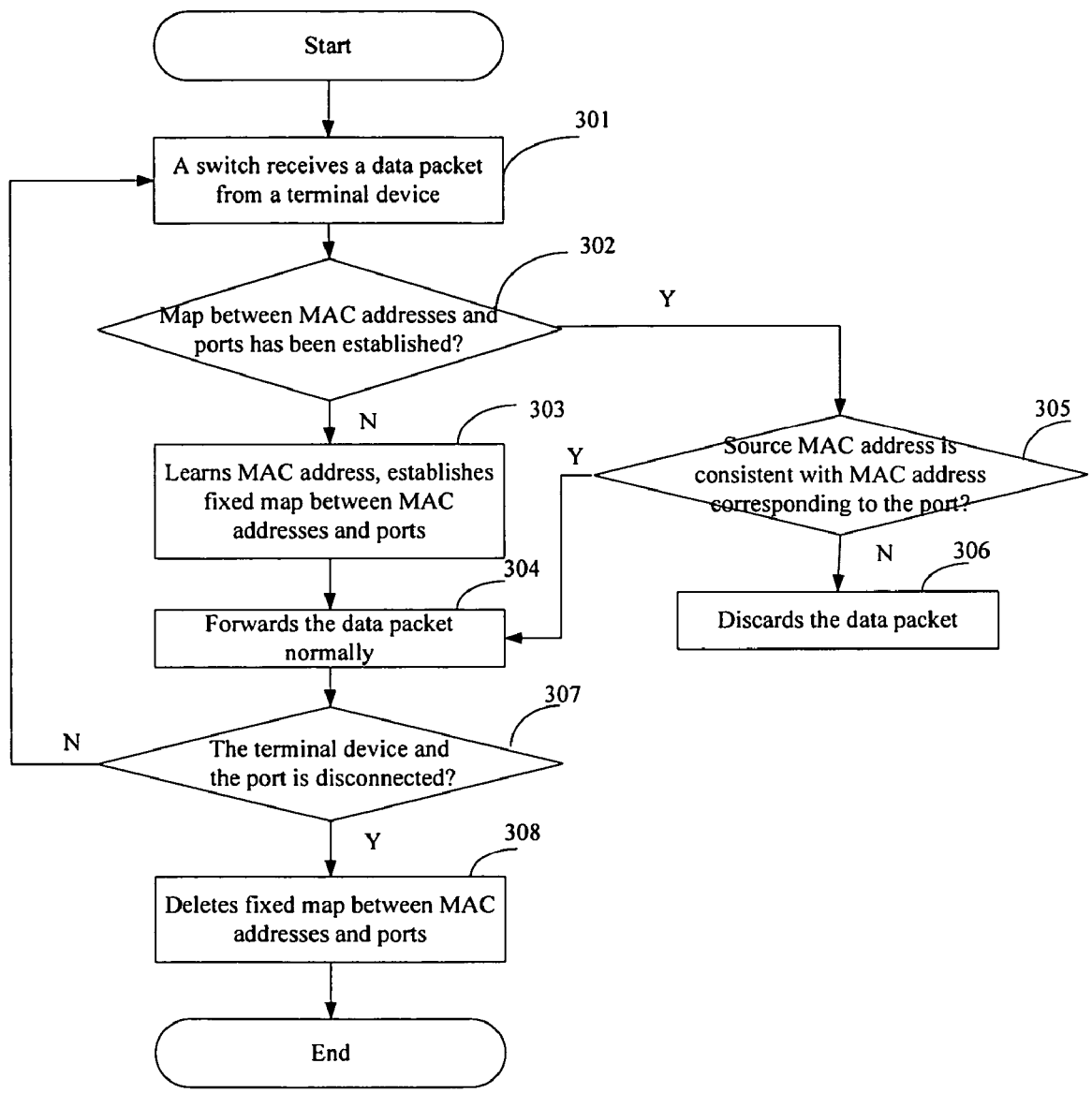
FIG. 3 is a schematic flow chart illustrating the entire process according to an embodiment of the invention.

FIG. 3 is a general flow chart according to an embodiment of the invention. Now, the embodiment of the present invention will be described in detail hereinafter with reference to FIG. 3.

After establishing a connection between an Ethernet user device and a switch port, in step 301, the switch receives a data packet from the terminal device.

In step 302, after receiving a data packet from the terminal device on a port, the switch judges whether the mapping between the MAC address carried in the data packet and the switch port has been established in a MAC port map based on MAC address learning process. If there is no entry in the MAC table for this terminal device, step 303 will be executed; otherwise, step 305 will be executed.

In step 303, the switch port implements MAC address learning process, i.e., establishes the map between the terminal device and the switch port.

In step 304, the data packet is forwarded according to the conventional forwarding processing.

In step 305, it is determined whether the source MAC address in the data packet is the same as the MAC address corresponding to the port in the MAC table. If they are the same, it indicates that the terminal device from which the data packet comes has the MAC address corresponding to the port in the MAC table, and step 304 will be executed. Otherwise, it indicates that the data packet is probably transmitted from a spurious MAC address by a malicious user, and step 306 in which the data packet is discarded will be executed. After it is judged that the two MAC addresses are inconsistent and the data packet is discarded, the occurrence of the inconsistency can be further recorded in a log and reported to the network administrator.

Forwarding data packet can be accomplished through the above-noted steps. Then in step 307, the switch judges whether the terminal device connected to the port is disconnected. If so, in step 308, the switch deletes the entry associated with the port in the current MAC table, i.e. deletes the map between the port and the MAC address of the current terminal device, then the current processing ends. If the port is once again connected with a terminal device, such as another terminal device, the same terminal device with a changed NIC, or the same terminal device with the same NIC, the processing flow of the embodiment will be restarted, i.e. the map between the port and the MAC address of the terminal device connected to the port will be re-established. If the connection is not cut off, step 301 and its following steps will be repeated.

In the embodiment, whether the connection is established between the terminal device and the port is judged by detecting physical signals in the port. Specifically, after a connection between the terminal device and the port is established and the terminal device is initiated, the switch can detect a high level on the port, this indicates the terminal device has been initiated. When the connection between the terminal device and the port is cut off, including the circumstance in which the power of the terminal device is broken, the switch can detect a low level on the port, this indicates the terminal device has broken the connection with the switch port, and the switch will delete the entry associated with this port in the MAC table.

In this embodiment of the present invention, the map between the MAC address of the terminal device and the switch ports is established based on MAC address learning mechanism, in such a way that the disadvantages of low maintenance efficiency and high cost induced by fixed binding of the MAC address information and the ports are overcome. And, as long as the connection between the terminal device and the port is not cut off, the entry associated with the port in the MAC address table will not be modified, therefore, running a software for fabricating MAC addresses in a PC will not affect the MAC table in the switch, and thus MAC address cheating or MAC address bombing and the like can be avoided. Therefore, with the embodiment, through dynamic binding of the terminal devices and the ports, security and reliability of network is improved, network maintenance efficiency is increased and maintenance cost is decreased.

It will be understood by one skilled in the art that the switch can be a two-layer switch or a three-layer switch, and this embodiment is not limited to switches, but can be any communication device, such as a firewall device or an Ethernet bridge based on MAC address leaning mechanism.

While this invention has been particularly shown and described with reference to an exemplary embodiment thereof, it will be understood by those skilled in the art that various changes in form and details may be made therein without departing from the spirit and scope of the invention as defined by the appended claims.

The invention claimed is:

1. A method for preventing Ethernet from being attacked, comprising:
   establishing and storing a fixed map between a port and a hardware address of a terminal device, after an Ethernet communication device detects a new connection between the port and the terminal device and receives a data packet from the terminal device;
   forwarding data packets according to the fixed map;
   if a hardware address carried in a data packet received from the terminal device is different from the hardware address corresponding to the port in the fixed map, prohibiting the fixed map between the port and the hardware address from being modified as long as the connection between the port and the terminal device is not cut off; and
   deleting the fixed map after the Ethernet communication device detects a disconnection between the port and the terminal device.

2. The method of claim 1, further comprising: after receiving the data packet from the terminal device, judging whether the fixed map has been established; wherein:
   if it is judged that the fixed map has been established, jumping to the step of forwarding the data packets;
   if it is judged that the fixed map has not been established, jumping to the step of establishing and storing the fixed map between the port and the hardware address of the terminal device.

3. The method of claim 2, wherein the forwarding of the data packets comprises judging whether a hardware address carried in a data packet is consistent with the hardware address corresponding to the port in said fixed map; if so, forwarding the data packet according to a conventional forwarding processing; otherwise, discarding the data packet.

4. The method of claim 3, further comprising: after discarding the data packet, recording result of the judging of whether the address carried in the data packet is consistent with the hardware address corresponding to the port in said fixed map, in a log and informing a network administrator.

5. The method of claim 1, wherein said hardware address is a Media Access Control (MAC) address.

6. The method of claim 1, wherein detecting the new connection or the disconnection between the terminal device and the port is implemented by detecting physical signals in the port.

7. The method of claim 1, wherein said Ethernet communication device is a two-layer switch, a three-layer switch, a firewall device or an Ethernet bridge.

8. The method of claim 1, wherein said terminal device is a personal computer, a server or an IP telephone set.

9. The method of claim 1, wherein said fixed map is stored in a hardware address table of the Ethernet communication device.

10. An Ethernet communication device for preventing Ethernet from being attacked, comprising:
    means for establishing and storing a fixed map between a port and a hardware address of a terminal device after detecting a new connection between the port and the terminal device and receiving a data packet from the terminal device;
    means for forwarding data packets according to the fixed map;
    means for prohibiting the fixed map between the port and the hardware address from being modified if a hardware address carried in a data packet received from the terminal device is different from the hardware address corresponding to the port in the fixed map, as long as the connection between the port and the terminal device is not cut off; and
    means for deleting the fixed map after detecting a disconnection between the port and the terminal device.

11. The Ethernet communication device of claim 10, further comprising:
    means for judging whether a hardware address carried in the a data packet is consistent with the hardware address corresponding to the port in said fixed map; if so, forwarding the data packet according to a conventional forwarding processing; otherwise, discarding the data packet.

* * * * *